(12) United States Patent
Fritsch

(10) Patent No.: US 6,391,232 B1
(45) Date of Patent: May 21, 2002

(54) INTEGRATED SOFT PADS FOR ONE STEP MOLDED PARTS

(75) Inventor: Manfred Fritsch, Highland, MI (US)

(73) Assignee: Magna Interior Systems, Inc., Aurora (CA)

( * ) Notice: Subject to any disclaimer, the term of this patent is extended or adjusted under 35 U.S.C. 154(b) by 0 days.

(21) Appl. No.: 09/731,119

(22) Filed: Dec. 6, 2000

Related U.S. Application Data
(60) Provisional application No. 60/169,144, filed on Dec. 6, 1999.

(51) Int. Cl.[7] .............................................. B29C 44/06
(52) U.S. Cl. .................... 264/46.6; 264/46.4; 264/267; 264/309; 264/254
(58) Field of Search ............................... 264/278, 46.6, 264/46.4, 267, 309, 254

(56) References Cited

U.S. PATENT DOCUMENTS

| | | | |
|---|---|---|---|
| 3,015,516 A | | 1/1962 | Clark |
| 4,456,644 A | | 6/1984 | Janz et al. |
| 4,783,114 A | | 11/1988 | Welch |
| 4,869,543 A | | 9/1989 | Grimes |
| 4,873,036 A | * | 10/1989 | Urai .......................... 264/46.6 |
| 4,890,878 A | | 1/1990 | Harary et al. |
| 4,919,470 A | | 4/1990 | Muller |
| 4,929,017 A | | 5/1990 | Lilienthal et al. |
| 5,073,318 A | * | 12/1991 | Rohrlach et al. .......... 264/46.5 |
| 5,082,609 A | * | 1/1992 | Rohrlach et al. .......... 264/46.4 |
| 5,104,596 A | * | 4/1992 | Kargarzadeh et al. ..... 264/46.5 |
| 5,387,390 A | | 2/1995 | Kornylo |
| 5,445,430 A | | 8/1995 | Nichols |
| 5,501,829 A | * | 3/1996 | Nichols ...................... 264/261 |
| 5,626,382 A | | 5/1997 | Johnson et al. |
| 5,692,711 A | | 12/1997 | Tucker |
| 5,759,464 A | * | 6/1998 | Matsumoto et al. ........ 264/138 |
| 5,820,191 A | | 10/1998 | Blakewood, Jr. et al. |
| 5,885,662 A | | 3/1999 | Gardner, Jr. |
| 5,951,094 A | | 9/1999 | Konishi et al. |
| 5,967,594 A | | 10/1999 | Ramanujam |
| 6,013,210 A | | 1/2000 | Gardner, Jr. |
| 6,017,617 A | | 1/2000 | Gardner, Jr. |
| 6,050,631 A | | 4/2000 | Suzuki et al. |

* cited by examiner

*Primary Examiner*—Allan R. Kuhns
(74) *Attorney, Agent, or Firm*—Clark Hill PLC

(57) ABSTRACT

A process for making a padded armrest on an interior door panel of an automotive vehicle includes the step of conforming an outer cover to a contoured surface of a mold. A blocking device is then placed against a portion of an inside surface of the outer cover and a rigid substrate if formed against the inside of the outer cover and about the blocking device providing a support structure for the outer cover. The blocking device is then removed from the outer cover and mold to form a cavity in the substrate defined by a portion of the outer cover. A resilient foam pad is inserted or formed within the cavity to provide local padded support to the outer cover.

20 Claims, 4 Drawing Sheets

INTEGRATED SOFT PADS FOR ONE STEP MOLDED PARTS

This application claims the benefit of U.S. Provisional Application No. 60/169,144, filed Dec. 6, 1999.

BACKGROUND OF THE INVENTION

1. Field of the Invention

The subject invention relates to a process for forming softly padded areas within a molded armrest of an interior door panel.

2. Description of the Related Art

By way of background, molded vehicle components, such as armrests, are known in the art and very common to automotive interior panels, such as door panels. Typically, an automotive armrest includes portions which are padded for comfortable support of a person's arm or hand. Most often, increased padding is achieved by applying foam backing to the inner surface of the armrest covering. This method does not allow for localization, and increases the cost due to extra foam backing applied where padding is not needed.

For example, U.S. Pat. Nos. 5,885,662; 6,013,210; and 6,017,617 disclose an interior panel, such as an interior door panel having an armrest, and process for making the same. The interior panel is manufactured by molding a composite structure of an inner layer chemically bonded to an outer layer. A polyurethane cellular foam filler is sprayed onto the composite structure and then a preformed rigid substrate is applied against the cellular foam filler to provide reinforcing strength and support to the inner and outer layers. The polyurethane cellular foam serves to unite the layered composite structure with the preformed rigid substrate.

Alternatively, localized padding can be achieved by applying a foam layer to the inner surface of the armrest covering and increasing the thickness of the foam layer at the point where increased localized padding is desired or inserting a foam pad of specific hardnesss-softness characteristics against the outer cover of the armrest. Such methods are exemplified in U.S. Pat. Nos. 4,869,543 and 5,387,390. To achieve this, specially manufactured pieces and additional processing steps must be utilized, which also add processing time and costs.

SUMMARY OF THE INVENTION

The disadvantages of the prior art may be overcome by providing a process for making an interior vehicle component having localized padding.

According to one aspect of the invention, there is provided a process for making a padded part for an interior of an automobile. The process includes the steps of providing an outer cover on a contoured mold. Placing a blocking device against a portion of an inside surface of the outer cover. Forming a substrate against the inside of the outer cover and about the blocking device. Providing a support structure for the outer cover. Removing the blocking device to form a cavity in the substrate and providing a resilient filler material within the cavity to give local padded support to the outer cover.

BRIEF DESCRIPTION OF THE DRAWINGS

Advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
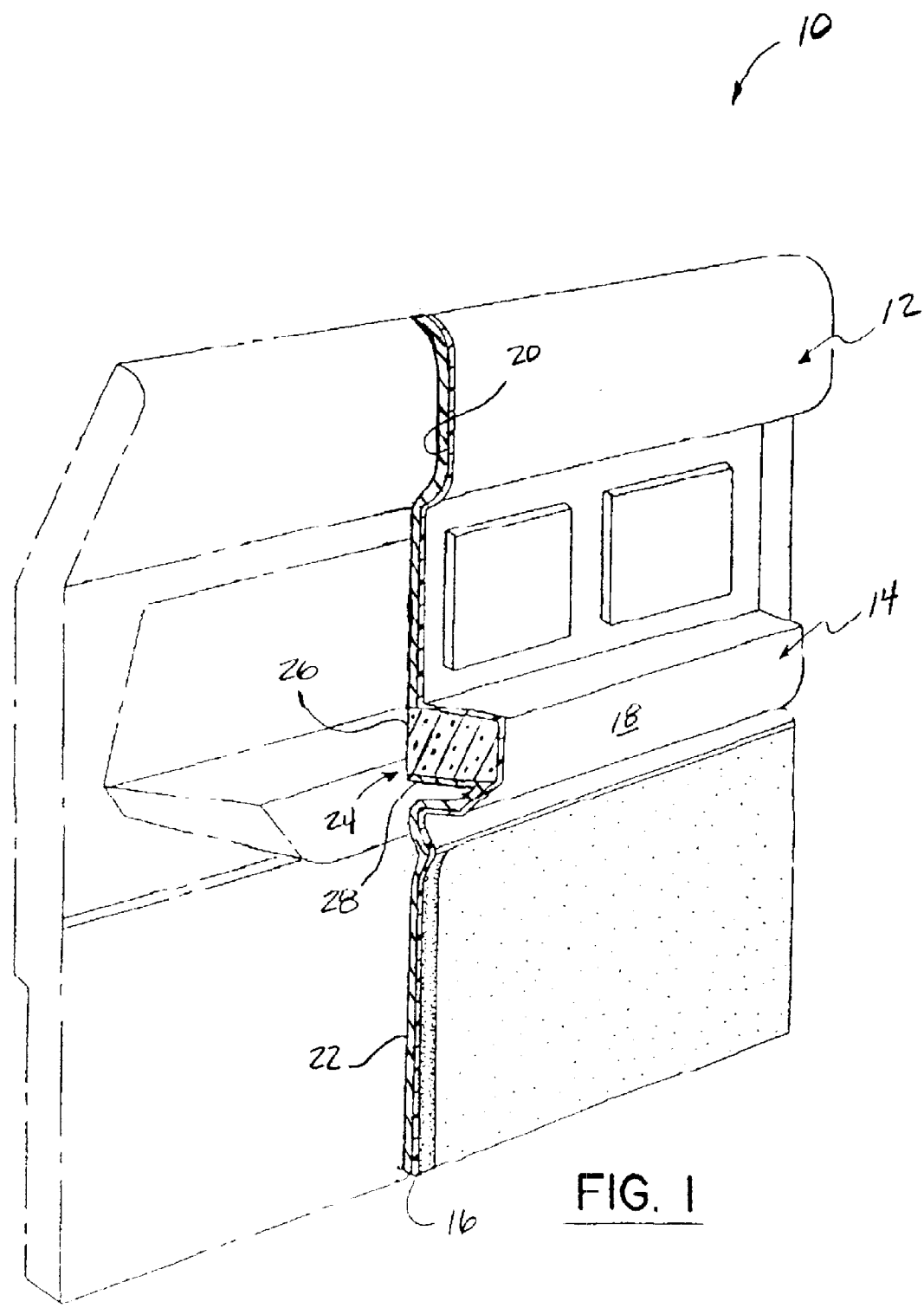
FIG. 1 is partially sectioned perspective view of a vehicle interior door panel and armrest constructed in accordance with the present invention.

Referring to the Figures, wherein like numerals indicate like or corresponding parts throughout the several views, an interior component, such as a interior door panel, for an automotive vehicle is generally shown at 10 in FIG. 1. The panel 10 includes a generally planar door covering portion 12 and an armrest portion 14, or padded part, for supporting the arm or hand of an occupant of the vehicle. As shown in the cross-section portion of FIG. 1, the panel 10 includes an outer cover 16 having an exterior surface 18 exposed or facing the interior of the vehicle and an interior surface 20 which is hidden from the interior of the vehicle. The panel 10 further includes a rigid, or semi-rigid, substrate 22 to provide structural support for the outer cover 16. The armrest portion 14 includes a cavity 24 for receiving a resilient pad 26 of filler material, such as urethane foam, a pre-formed foam bun, or liquid foam-in-place urethane material, to provide a soft padded backing to a portion of the outer cover 16 defined by the cavity 24 of the armrest portion 14. The substrate 22 is typically molded or adhered to the interior surface 20 of the outer cover 16 to provide structural shape and padded support to the outer cover 16. However, the substrate 22 does not extend over the portion of the outer cover 16 defining the cavity 24. The substrate 14 may include a rib 28, or plurality of ribs, to provide extra support and to further define the cavity 24.

Figure 2:
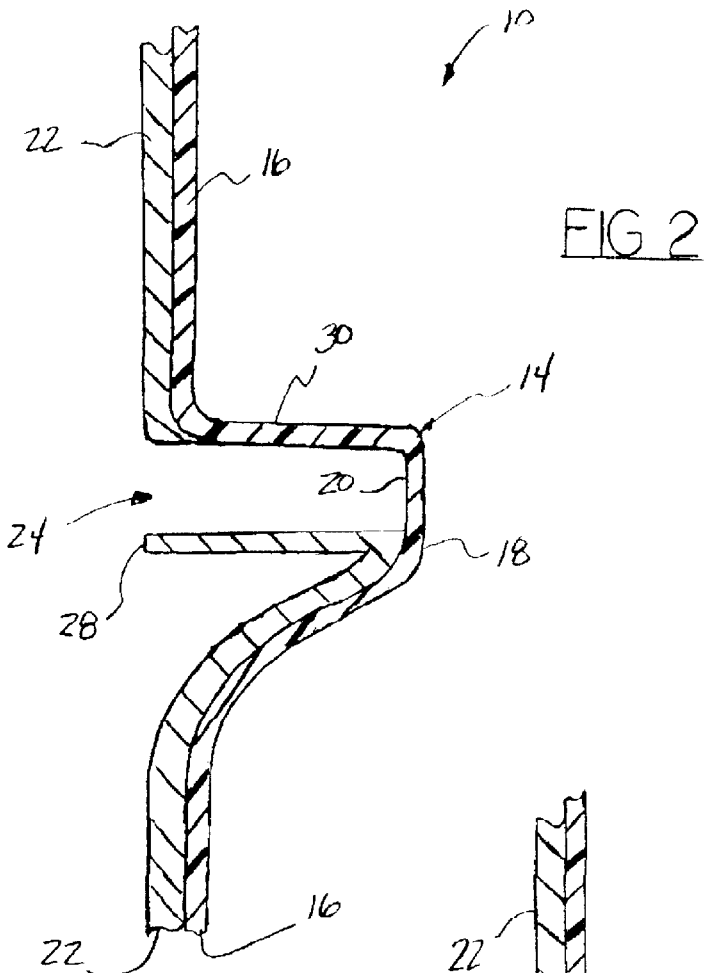
FIG. 2 is a cross-sectional view of the armrest portion of the door panel of FIG. 1 including a cavity formed by the present invention for receiving a pad of filler material.
Figure 3:
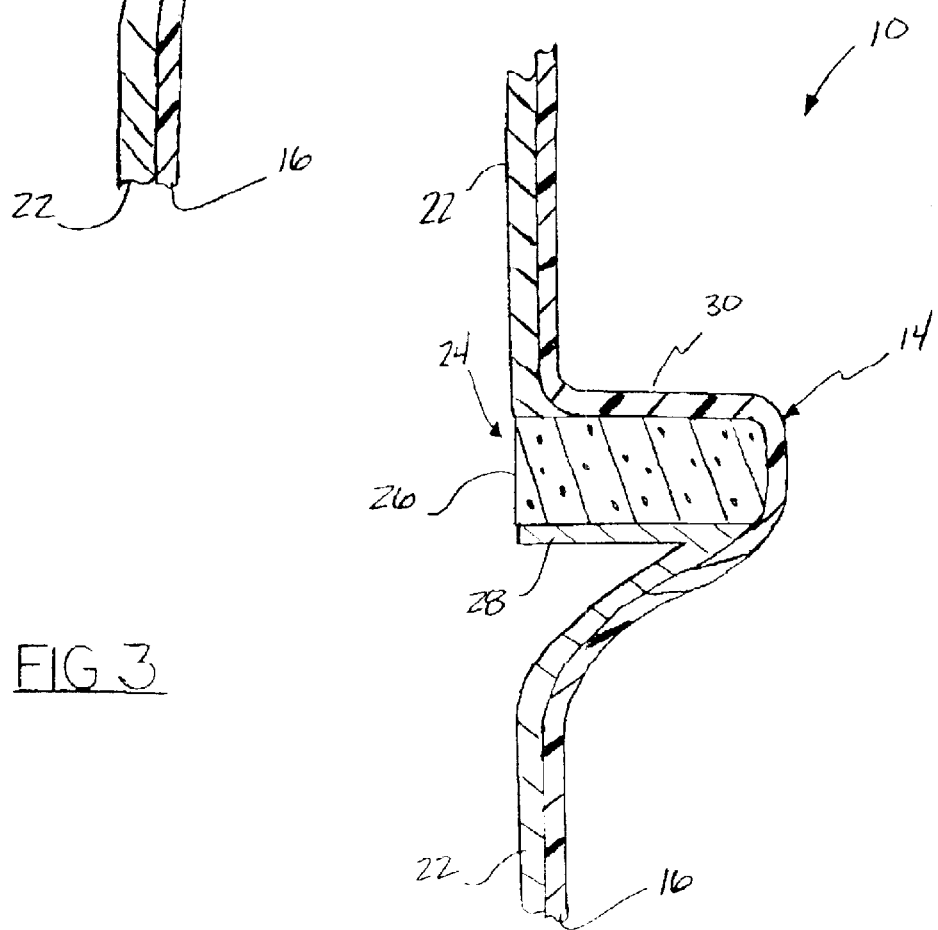
FIG. 3 is a cross-sectional view of the armrest portion including the pad of filler material inserted within the cavity.
Figure 4:
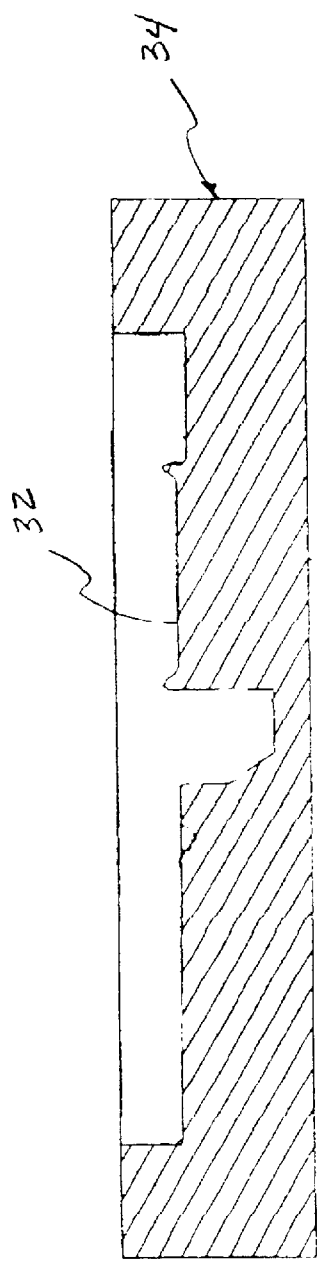
FIG. 4 is a cross-sectional view of a mold for forming the interior door panel.
Figure 5:
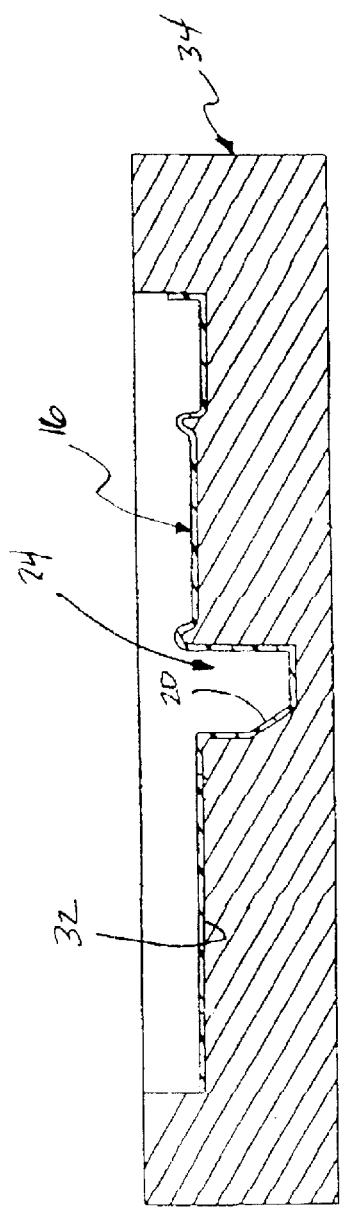
FIG. 5 is a cross-sectional view of the mold supporting a contoured outer cover of the door panel.
Figure 6:
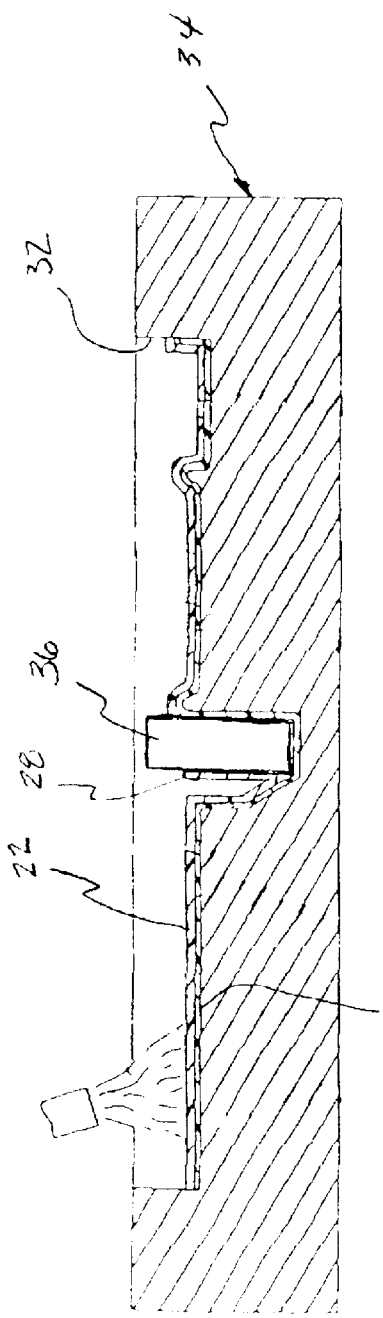
FIG. 6 is a cross-sectional view of the mold having a substrate formed against the outer cover and about the blocking device inserted in the mold for forming the cavity in the armrest.
Figure 7:
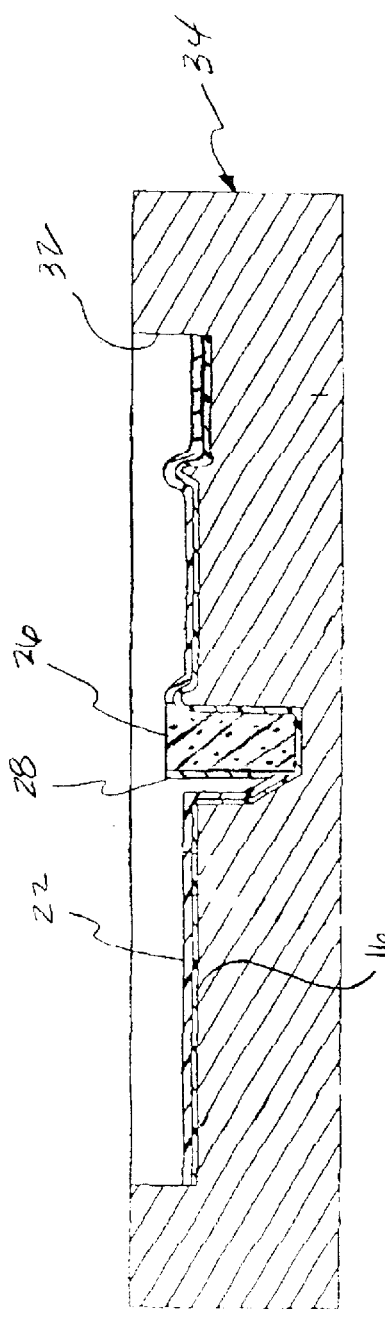
FIG. 7 is cross-sectional view of the mold with the blocking device removed from the cavity and a pad of filler material inserted or formed with the cavity.

Referring to FIGS. 2 and 3, the cavity 24 is formed by a portion of the outer cover 16 in the armrest portion 14. The cavity 24 may be further defined between a generally horizontal portion 30 of the outer cover 16 defining the top support surface of the armrest 14 and the generally horizontal rib 28 which is generally parallel to and spaced from the horizontal portion 30. However, the cavity 24 may also be formed entirely by a portion of the outer cover 16. As shown in FIG. 3, when a foam or liquid filler material forming the resilient pad 26 is received within the cavity 24, the foam or liquid filler material will provide a support backing for the portion of the outer cover 16 over the cavity 24, thereby providing a soft padded support area on the armrest portion 14. The softness of the armrest portion 14 is dependant upon the type of filler material used for the resilient pad 26. That is, different types of foam, gel, or liquid may be used as are commonly known to those skilled in the art. Further, an insert can be molded as a preformed resilient pad 26 to fit within the cavity 24, made from foam or other suitable material, and may be held within the cavity 24 by adhesive.

Referring to FIGS. 4–7, the present invention relates to a process for making the panel 10 and padded armrest portion 14 including the cavity 24 immediately below the outer cover 16 for localized padded support within the armrest portion 14 including the step of placing the outer cover 16 onto a contoured surface 32 of a mold 34 and conforming the outer cover 16 to the contours of the contoured surface 32 of the mold 34. The outer cover 16 may be a sheet of material such as vinyl, leather, cloth, plastic or blend thereof, as is commonly known to one skilled in the art. The mold 34 may include a vacuum mold for providing vacuum pressure to assist the outer cover 16 to fully conform to the mold surface 32 and hold the cover 16 against the mold surface 32 as is commonly known to one skilled in the art.

Optionally, the outer cover 16 may be formed directly onto the contoured surface 32 of mold 34 by spraying a reaction mixture of a cover material comprising polyurethane and then polyol and polyisocyanate as more fully described in U.S. Pat. Nos. 5,885,662; 6,013,210; and 6,017,617. Alternatively, the outer cover 16 may be formed on a similarly contoured mold and then transferred to the mold 34.

The process further includes placing a blocking device 36 in the mold 34 along a portion of the interior surface 20 of the outer cover 16 at a localized position in the mold 34 adjacent to a portion of the outer cover 16. The blocking device 36 may include a pre-formed and pre-shaped block of plastic, metal, wood or other material, provided that the blocking device does not permanently bond or adhere to the substrate 22 or the outer cover 16. Optionally, a release agent could be pre-applied to the blocking device 36 prior to presentation to facilitate release.

The blocking device 36 may be a separate component which is manipulated in place by a robot as is well known in the art. Alternatively, blocking device 36 may be incorporated into an upper mold. The method of applying the rigid substrate 22 will determine which method is the most suitable.

The substrate 22 is then formed against the interior surface 20 of the outer cover 16 and about, or around, the blocking device 36, providing a support structure for the outer cover 16. The blocking device 36 is then removed from the mold 34, forming the cavity 24 in the substrate 22 for receiving the filler material defining the resilient pad 26. The filler material defining the resilient pad 26 is applied within the cavity 24 to give localized padded support to the outer cover 16 and armrest portion 14. The resilient pad 26 may be applied within the cavity 24 by application of inserting a pre-formed foam pad into the cavity 24, pouring or spraying a liquid foam or gel into the cavity 24, or other suitable applications.

The substrate 22 in the preferred embodiment may be formed surface 20 and around the blocking device 36 by pouring or spraying a liquid material, such as plastic, urethane, polyurethane, or the like, to cure as the substrate 22 within the mold 34. Alternatively, the substrate 22 may be a pre-formed substrate 22 applied against the interior surface 20 of the outer cover 16 and attached thereto by adhesive or other means.

The invention has been described in an illustrative manner, and it is to be understood that the terminology which has been used is intended to be in the nature of words of description rather than of limitation. Many modifications and variations of the present invention are possible in light of the above teachings. It is, therefore, to be understood that within the invention may be practiced otherwise than as specifically described.

What is claimed is:

1. A process for making a padded part for an interior of an automobile, said process comprising the steps of:
    providing an outer cover within a contoured mold;
    placing a blocking device against a portion of an inside surface of the outer cover;
    forming a substrate against the inside of the outer cover and about the blocking device to provide a support structure for the outer cover;
    removing the blocking device to form a cavity in the substrate; and
    providing a resilient filler material within the cavity to give local padded support to the outer cover.

2. A process as set forth in claim 1 wherein said step of providing an outer cover includes a step of spraying a reaction mixture of cover material on the contoured mold.

3. A process as set forth in claim 2 further including the step of contouring the outer cover against the contour of a mold surface on the mold.

4. A process as set forth in claim 3 further including the step of forming a contoured cavity defined by a portion of the outer cover.

5. A process as set forth in claim 4 further including the step of placing the blocking device in the contoured cavity defined by the portion of the outer cover and against the inside surface of the outer cover.

6. A process as set forth in claim 5 further including the step of spraying a liquid material against the inside surface of the outer cover and around the blocking device to form a semi-rigid substrate to provide the support structure for the outer cover.

7. A process as set forth in claim 6 further including the step of forming at least one rib in the substrate adjacent at least a portion of the blocking device to further define the cavity.

8. A process as set forth in claim 7 further including the step of removing the blocking device from the mold to form the cavity defined by the portion of the outer cover and substrate.

9. A process as set forth in claim 8 further including the step of inserting a resilient foam pad within the cavity to provide a localized padded support portion in the outer cover.

10. A process as set forth in claim 8 further including the step of spraying a liquid urethane material into the cavity to foam the resilient foam pad.

11. A process as set forth in claim 8 further including the step of inserting a pre-formed resilient foam pad with the cavity.

12. A process as set forth in claim 2 further including the step of contouring the outer cover against the contour of a mold surface on the mold.

13. A process as set forth in claim 12 further including the step of forming a contoured cavity defined by a portion of the outer cover.

14. A process as set forth in claim 13 further including the step of placing the blocking device in the contoured cavity defined by the portion of the outer cover and against the inside surface of the outer cover.

15. A process as set forth in claim 14 further including the step of spraying a liquid material against the inside surface of the outer cover and around the blocking device to form a semi-rigid substrate to provide the support structure for the outer cover.

16. A process as set forth in claim 15 further including the step of forming at least one rib in the substrate adjacent at least a portion of the blocking device to further define the cavity.

17. A process as set forth in claim 16 further including the step of removing the blocking device from the mold to form the cavity defined by the portion of the outer cover and substrate.

18. A process as set forth in claim 17 further including the step of inserting a resilient foam pad within the cavity to provide a localized padded support portion in the outer cover.

19. A process as set forth in claim 17 further including the step of spraying a liquid urethane material into the cavity to foam the resilient foam pad.

20. A process as set forth in claim 17 further including the step of inserting a pre-formed resilient foam pad with the cavity.

* * * * *